United States Patent Office 3,111,577
Patented Nov. 19, 1963

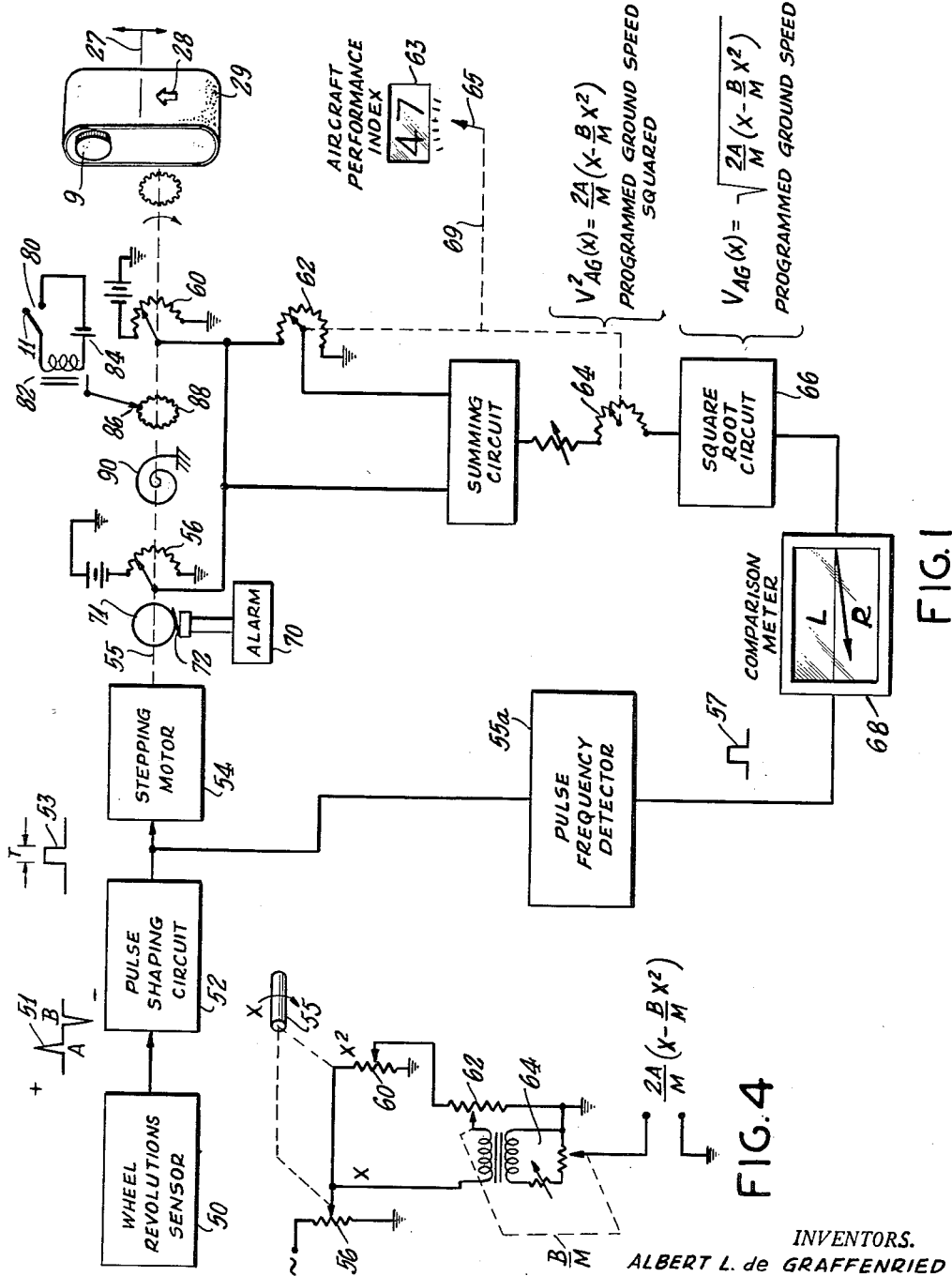

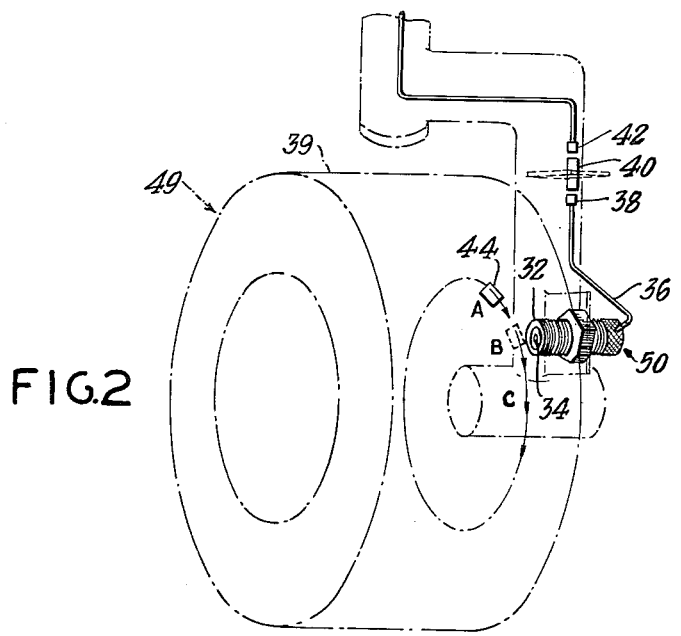
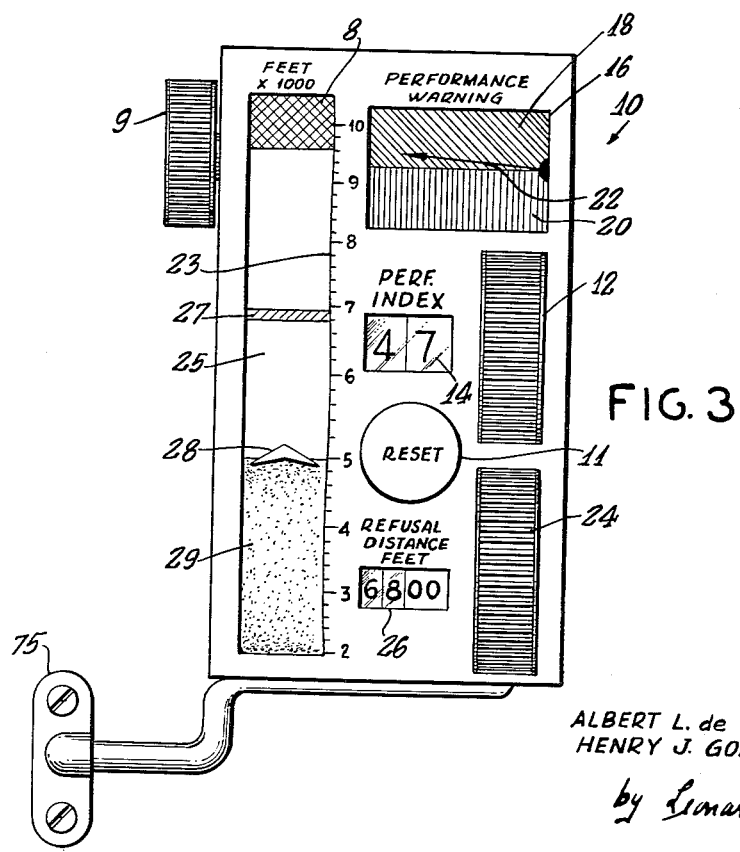

3,111,577
TAKEOFF MONITOR FOR JET AIRCRAFT
Albert L. de Graffenried, Roslyn Harbor, and Henry J. Goffi, Jackson Heights, N.Y., assignors to Avien, Inc., Woodside, N.Y.
Filed Nov. 17, 1960, Ser. No. 69,937
4 Claims. (Cl. 235—151)

This invention relates to an apparatus for monitoring the takeoff and or landing of an aircraft and is particularly suited to, but not limited to, the requirements of jet aircraft.

The length of runway required by an aircraft in order to be able to clear an obstacle (just beyond the end of the runway) depends on many factors, viz., the gross weight of the aircraft ($F_W$), the maximum thrust which the aircraft can develop ($F_T$), the aerodynamic drag ($F_D$), rolling friction force ($F_R$) of the wheels, and runway slope force ($F_S$) due to gravity.

Whenever these several variables work together in such a way as to make for low aircraft acceleration, the amount of runway required for takeoff becomes dangerously large, frequently exceeding the amount of runway available. It is therefore most desirable to have on board the aircraft a means for telling the pilot how his aircraft is performing relative to the normally-expected performance under any given ambient conditions.

For any given aircraft, set of ambient conditions, and length of runway, there is a particular important speed known as the "refusal speed." This is the maximum speed which an aircraft can attain on a given runway (with all engines performing normally) and still stop on the remaining amount of runway. The point along the runway where this maximum speed occurs is called the "refusal point." If the pilot is informed, prior to the refusal point, that his aircraft is malfunctioning, he can elect to abort the takeoff and decelerate safely. However, once he has passed the refusal point, it becomes dangerous to abort. On the other hand, if the aircraft has attained "refusal speed" at the time of reaching the "refusal point," the pilot may safely elect to continue takeoff for malfunctions up to the equivalent of one engine dead. It is therefore of very great value to the pilot to know:

(1) When he has reached the vicinity of the refusal point; and
(2) How his actual ground speed compares with the normally expected ground speed at this location.

It is also important that such takeoff-monitoring means be reliable. As an illustration, if the instrument informs the pilot that his aircraft is performing normally when, in reality, it is sub-normal, the danger is obvious. On the other hand, if the instrument tells the pilot that his aircraft is performing sub-normally, when it really is performing normally, this will cause him to unnecessarily execute flight abort procedure with all its potential dangers from skids, overstressing of the landing gear, and passenger panic. It is clear then that a takeoff monitor must in no way mislead the pilot, if it is to serve as an effective safety device.

In addition, the instrument should be easily operated and quite simple to read and interpret, if pilot error in using the device is to be avoided. The system should provide a continuous indication of performance during the takeoff roll using only the simplest symbols and geometric patterns of display for rapid visual assimilation.

It is the object of this invention to provide a takeoff monitoring means which will fulfill the requirements outlined above.

It is an object of this invention to provide an improved takeoff monitor for aircraft.

It is another object to provide a takeoff monitor for aircraft which may be used to measure elapsed runway distance on landing.

Still another object of this invention is to provide a takeoff monitor for aircraft requiring only a simple setting.

A further object of this invention is to provide a takeoff monitor of simple reliable design which provides a continuous display of achieved speed versus programmed speed.

A particular object of this invention is to provide a takeoff monitor employing a single aircraft performance data insertion means.

In order to fulfill the aforementioned requirements, the invention herein described employs means for generating a voltage proportional to the normally-expected ground speed as a function of distance traveled along the runway. A second means is used to produce a voltage directly proportional to the actual ground speed of the aircraft during the takeoff roll. The voltage generated by said first means is subtracted from the voltage generated by said second means and the difference voltage is then applied to a meter having a center-scale zero. The field to one side of the zero is red while the field on the other side is green. If the actual ground speed exceeds the normally expected ground speed, the meter needle will indicate on the green-field side of center zero. If the actual ground speed is less than the normally expected value, the meter needle will indicate in the red field.

Still other objects and advantages of the invention will in part become obvious and will in part be pointed out with particularity as the following description proceeds taken in conjunction with the accompanying drawings.

In the drawings:
FIG. 1 is a block diagram of the apparatus.
FIG. 2 is a pictorial showing of a wheel revolution sensing means with an aircraft wheel and landing gear shown in phantom.
FIG. 3 is a front view of a control box having incorporated display means.
FIG. 4 shows schematically a portion of the circuit employed for computation.

It has been found that as an aircraft rolls down the runday during takeoff the ground speed, "$V_{AG}$", varies with the distance, "X", in accordance with the following equation:

$$V_{AG}(x) = \sqrt{\frac{2A}{M}\left(X - \frac{B}{M}X^2\right)}$$

where A, B, and M are constants characteristic of any given aircraft under given ambient conditions.

The means for generating a signal voltage proportional to normally-expected ground speed as a function of distance traveled along the runway will now be described with reference to the drawings.

In the block diagram of FIG. 1 there is shown a wheel-revolutions sensor 50 which is a variable reluctance device mounted on the landing gear 49 adjacent to the rim of the landing wheel. As shown in FIG. 2, the sensor is composed of an outer pole 32, and an inner pole 34, which is a permanent magnet around which a coil of wire is wound. The ends of the coil are brought out through cable 36 to quick-disconnected plug 38.

A piece of magnetizable iron 44 approximately $\frac{1}{32}''$ x $1''$ x $1''$ is affixed to the rim of the landing wheel 39. As the wheel rotates, the iron 44 passes about $\frac{1}{8}''$ away from members 32, 34, providing a magnetic flux path. When part 44 is at position A, the reluctance of the magnetic circuit is a maximum. As part 44 moves through position B, the reluctance decreases rapidly, but then rises again rapidly as part 44 moves on to position C. Every time the landing wheel makes one complete rotation, the part 44 passes through this gap and produces a pair of voltage pulses 51a, 51b, as shown in FIG. 1. The negative pulses 51b is used to trigger a pulse-shaping circuit 52 which may be a one-shot (monostable) multi-vibrator, a type well known in the art. (See for example, "Radar Circuit Analysis," A.F. Manual 52–8, 1951 Edition, pages 6–65.)

The output of the pulse-shaping circuit 52 is a flat-topped pulse 53 having a duration T which is independent of the repetition rate of the triggering pulse 51b. The flat-topped pulse 53 is applied to a stepping motor 54 which is mechanically coupled to potentiometer shaft 55. Each time the stepping motor receives a pulse 53 it advances shaft 55 a small rotational step, carrying the wipers of potentiometers 56 and 60 with it.

Potentiometer 56 is a linear potentiometer with a constant voltage applied to its fixed terminals. Since its shaft is advanced one small step for each wheel revolution, the voltage appearing at the wiper of potentiometer 56 is directly proportional to distance traveled along the runway, X. The shaft of potentiometer 60 also davances one step for each wheel revolution, but the voltage applied to its fixed terminals is the voltage from the wiper of potentiometer 56 which is proportional to X. The voltage at the wiper of potentiometer 60 is therefore proportional to $X^2$.

The output of potentiometer 60 is applied to the fixed terminals of potentiometer 62. This is a potentiometer which multiplies $X^2$ by a constant, $B/M$, to yield $$\frac{B}{M}X^2$$

The outputs of potentiometer 62 and potentiometer 56 are added in a summing circuit (FIG. 4) and their sum is applied to the fixed terminals of potentiometer 64, the $2A/M$ potentiometer. The voltage on the wiper of potentiometer 64 therefore represents:

$$\frac{2A}{M}\left(X-\frac{B}{M}X^2\right)$$

which is equal to the normally-expected ground speed squared. A square-root circuit (using diodes or other well kown means) is then used to extract the square root of this value which is the normally-expected ground speed. The output of the square-root circuit is fed to the comparison meter which is a D'Arsonval movement.

The shaft of potentiometer 62, the $B/M$ potentiometer and the shaft of potentiometer 64, the $2A/M$ potentiometer, are ganged to a single shaft 69 (FIG. 1) to provide a single knob for the entry of data representing expected aircraft performance. These two potentiometers can be ganged only if, for each value of $B/M$ on potentiometer 62, there exists a corresponding value of $2A/M$ on potentiometer 64 at the same shaft position. For an given type aircraft, the takeoff performance curves $V_{AG}$ versus X are available from the manufacturer, and from this family of curves the range of values of $B/M$ and corresponding $2A/M$ values can be computed. If $B/M$ is plotted as a function of $2A/M$ on linear graph paper, the resulting curve may be used to define the taper of potentiometer 62 when a linear potentiometer 64 is employed—or vice versa—to permit 62 and 64 to be ganged.

It is noteworthy here that the pilot need never be concerned with the numerical values of $B/M$ and $2A/M$ once the shafts of 62 and 64 are properly phased. A transparent overlay carrying simple integral reference numbers from 10 to 100 can be supplied to the pilot who places this sheet directly upon the family of $V_{AG}$ versus X curves. When he has completed his takeoff calculations and selected the relevant $V_{AG}$ versus X curve, the number of that curve appearing on the overlay sheet is set into the control unit 10 of FIG. 3 using knurled data entry knob 12. The number entered appears at window 14 in digital form, in this example a "47". Knurled knob 12 of FIG. 3 corresponds to knob 65 of FIG. 1. Likewise, digital readout 14 of FIG. 3 corresponds to window 63 of FIG. 1. Meter 68 of FIG. 1 corresponds to meter 16 of FIG. 3; this is the "how goes it" or performance meter indicating the difference between actual ground speed and normally-expected ground speed. Pointer 22 in FIG. 3 is shown to be positionable in either the green 18 or red 20 field.

Knurled knob 24 is used to set in the "Refusal Distance." This distance is defined as the distance from the beginning of the runway to that farthest point down the runway where the pilot can still stop his aircraft on the remaining length of runway. The refusal distance is calculated by the pilot and entered into Control Unit 10, FIG. 3, using knurled knob 24 until the desired value shows at digital readout window 26—6800 feet in this example—and also until the refusal-point bar 27 is positioned along the vertical strip 25 at the location corresponding to 6800 feet, as shown.

Symbol 28 represents the top view of the aircraft, and moves upward as the actual aircraft proceeds along the runway. Aircraft symbol 28 and its supporting tape 29 are driven by shaft 55 of FIG. 1 and move proportional to the number of wheel revolutions. Since the rolling radius of an aircraft wheel changes slightly during the takeoff roll, scale 23 of FIG. 3 is made slightly non-linear to maintain minimum error.

Returning now to FIG. 1, the output pulse 53 of the pulse-shaping circuit 52 is fed to a Pulse Frequency Detector circuit 55a which employs a saturable transformer. During the rise time of pulse 53, a voltage appears across the secondary of the transformer. However, when the current throught he primary of the transformer has reached a value at which the magnetic circuit of the transformer suddenly saturates (the knee of the saturation curve of the saturated transformer) the voltage across the secondary of the transformer drops to zero, since the rate of change of magnetic flux drops to zero. The fact that the saturation value of flux is a stable quantity means that the pulses at the output of circuit 55a are of constant area; this is directly attributable to the relationship:

$$e_x \Delta t = n\frac{d\phi}{sdt}\Delta t = \frac{di_p}{dt}\Delta t = \Delta \phi$$

$$= \text{constant}$$

Stated another way: the voltage at the secondary (which is proportional to the rate-of-change of the primary current) may be large or small, but the duration of the pulse will vary inversely to the rate-of-change of the primary current. This feature is used to provide constant-area pulses at 57 so as to produce a current through meter 68 proportional to pulse frequency only. Since the number of pulses is proportional to distance X, the pulse frequency is proportional to ground speed, $V_{AG}$. The currents from circuits 55a and 66 are passed through the D'Arsonval movement of meter 68 in opposite directions in order to produce a difference quantity (actual ground speed minus normally-expected ground speed). A suitable frequency detector of this type is marketed by Airpax Electronics, Inc., of Fort Lauderdale, Florida, and described in their Bulletin F–25.

The reset button 11 is used to set all circuits at their zero positions after taxiing and just prior to takeoff. Depressing button 11 closes switch 80 energizing relay 82 from power source 84. This lifts detent 86 from ratchet gear 88. Spring 90, which is wound by the action of rotating shaft 55, returns the shaft to the zero position.

During a large portion of all takeoffs there is some wind present. The effect of this wind is to increase slightly the aerodynamic drag of the aircraft during the takeoff roll. If the wind is factored into the solution of the equation mentioned earlier, the result is an implicit function, and it is not possible to solve directly for $V_{AG}$ in terms of X and the wind. However, a numerical solution on a digital computer is readily achieved. Such a solution shows that a fairly large headwind has relatively little effect on the ground speed, viz., 20 knots headwind, causes a 2% reduction of ground speed at 100 knots for a typical four engine medium range jet aircraft. However, if the headwind is steady and it is desirable to take it into account, a simple curve can be supplied which relates the no-wind data-entry number (illustrated as "47") to a new "wind-present" data-entry number.

In order to alert the pilot when he has reached a point about four seconds prior to reaching the refusal point, a signaling device 70 is automatically triggered by a cam 71 and switch 72 arrangement shown in FIG. 1. If the pilot is not watching his takeoff monitor indicator, this alarm summons his attention sufficiently in advance to allow him to (1) observe the performance meter, (2) make a decision, and (3) take appropriate action and to provide time for the aircraft to respond to his action.

The control and display means shown in FIG. 3 are housed in a small case, approximately 3" wide, 4" tall and 3" deep, which may be positioned on a foldway bracket 75 in the front of an aircraft. When the takeoff is completed, the case may be folded out of the pilot's line of vision.

At the side of the case 10 shown in FIG. 3 is a knurled knob 9 which is connected so as to move a slide 8 along the upper end of strip 25. Before takeoff, the pilot adjusts this slide to show where the end of the particular runway under use occurs. This slide helps to make more realistic the pictorial presentation of aircraft and runway offered by this display. The master On-Off switch may be conveniently coupled to knob 9 so that the same operation turns on instrument and sets the slide.

One additional advantage of this invention is the fact that the distance-measuring portion of the system can be utilized during the landing roll, starting immediately after touch-down to indicate the amount of runway used up. This information is frequently of value to pilots when landing at high speed on a runway of marginal length.

Since the $V_{AG}$ versus X curves based on actual test data are supplied by the aircraft manufacturer, one can readily develop a family of overlay numbers. This is done by setting up the equations $$(V_{AG_1})^2 = \frac{2A}{M}\left(X_1 - \frac{B}{M}X_1^2\right) \quad (a)$$

$$(V_{AG_2})^2 = \frac{2A}{M}\left(X_2 - \frac{B}{M}X_2^2\right) \quad (b)$$

One now selects, from the supplied curves, particular values of $X_1$, $X_2$ and corresponding $V_{AG_1}$ and $V_{AG_2}$ values from a particular $V_{AG}$ versus X curve and substitutes them in Equations $a$ and $b$ respectively. This results in simultaneous equations in terms of $A/M$ and $B/M$, which equations may now be solved to yield values of A and B for the overlay curves.

The thus calculated values of $A/M$ and $B/M$ completely describe a particular curve, and may therefore be assigned, as a pair of values, a simple number, the set-in value, which is used on the overlay to designate the particular curve.

M is the mass of the loaded aircraft.

Having thus disclosed the best embodiment of my invention currently contemplated, what is claimed is:

1. An aircraft takeoff monitor mounted in an aircraft supported on the ground by rotatably mounted wheels comprising in combination:
   means for sensing the rotation of said wheels and providing a first series of pulses, the number of said pulses being in direct proportion to the number of revolutions made by said wheels;
   means responsive to the pulse rate of said first series of pulses for providing a signal indicative of said pulse rate;
   second means responsive to said first series of pulses for providing a signal proportional to the total number of first series pulses;
   an elongated strip display means, representative of a runway, controlled by actuating means responsive to said first series of pulses for indicating the distance traversed by said aircraft;
   adjustable means for indicating on said display means a specific distance;
   means responsive to the output signal of said second means for providing a squared signal whose amplitude is proportional to the square of the amplitude of said output signal;
   means responsive to said squared signal for modifying said squared signal by multiplying it with the ratio $B/M$ where B and M are constants, characteristic of said aircraft under given ambient conditions;
   a summing circuit for summing said output signal and said modified squared signal;
   means in cascade with said summing circuit for multiplying the output signal of said summing circuit with the ratio, $2A/M$, where A and M represent constants characteristic of said aircraft under given ambient conditions;
   means to vary the set in value of said ratios;
   means to derive the square root of the said multiplied output signal of said summing circuit and to provide an output signal, $V_{AG}(x)$, related to the distance, X, traversed by the aircraft in accordance with the formula $$V_{AG}(x) = \sqrt{\frac{2A}{M}\left(X - \frac{B}{M}X^2\right)}$$

means for comparing the said pulse rate signal with the signal $V_{AG}(x)$ and means for displaying the comparative value of said last named signals.

2. The apparatus of claim 1 wherein said strip display means is in the form of a tape.

3. An aircraft takeoff monitor mounted in an aircraft supported on the ground by rotatably mounted wheels comprising in combination:
   means for sensing the rotation of said wheels and providing a first series of pulses, the number of said pulses being in direct proportion to the number of revolutions made by said wheels;
   means responsive to said first series of pulses for providing a series of constant area D.C. pulses;
   second means responsive to said first series of pulses for providing a signal proportional to the total number of first series pulses;
   a display means responsive to said first series of pulses for indicating the distance traversed by said aircraft;
   means responsive to the output signal of said second means for providing a squared signal whose amplitude is proportional to the square of the amplitude of said output signal;
   means responsive to said squared signal for modifying said squared signal by multiplying it with the ratio $B/M$ where B and M are constants, B being the rate at which drag of the aircraft increases with the square of the speed and M is the mass of the aircraft;
   a summing circuit arranged to sum said output signal and said modified squared signal and provide an output signal;
   means in cascade with said summing circuit for multiplying the output signal of said summing circuit with the ratio, $2A/M$, where A represents the thrust of the aircraft and M is the mass of the aircraft;
   means to simultaneously vary the set in value of the ratios $2A/M$ and $B/M$;
   means to derive the square root of the said multiplied output signal of said summing circuit and to provide an output signal, $V_{AG}(x)$, related to distance traversed by the aircraft in accordance with the formula $$V_{AG}(x) = \sqrt{\frac{2A}{M}\left(X - \frac{B}{M}X^2\right)}$$

means for comparing the average amplitude of said series of D.C. pulses with the signal, $V_{AG}(x)$, and means for displaying their comparative value.

4. An aircraft takeoff monitor mounted in an aircraft supported on the ground by rotatably mounted wheels comprising in combination:

means for sensing the rotation of said wheels and providing a first series of pulses, the number of said pulses being in direct proportion to the number of revolutions made by said wheels;

means responsive to the pulse rate of said first series of pulses for providing a signal indicative of said pulse rate;

second means responsive to said first series of pulses for providing a signal proportional to the total number of first series pulses;

a tape type display means controlled by actuating means responsive to said first series of pulses for indicating the distance traversed by said aircraft;

adjustable means for indicating on said display means a specific distance;

alarm means actuated by said actuating means for indicating when said aircraft has traversed said specific distance;

means responsive to the output signal of said second means for providing a squared signal whose amplitude is proportional to the square of the amplitude of said ouptut signal;

means responsive to said squared signal for modifying said squared signal by multiplying it with the ratio $B/M$ where B and M are constants, characteristic of said aircraft under given ambient conditions;

a summing circuit for summing said output signal and said modified squared signal;

means in cascade with said summing circuit for multiplying the output signal of said summing circuit with the ratio, $2A/M$, where A represents a constant characteristic of said aircraft under given ambient conditions;

means to vary the set in value of the ratios $2A/M$ and $B/M$;

means to derive the square root of the said multiplied output signal of said summing circuit and to provide an output signal, $V_{AG}(x)$, related to the distance, X, traversed by the aircraft in accordance with the formula $$V_{AG}(x) = \sqrt{\frac{2A}{M}\left(X - \frac{B}{M}X^2\right)}$$

means for comparing the said pulse rate signal with the signal $V_{AG}(x)$ and means for displaying the comparative value of said last named signals.

References Cited in the file of this patent

UNITED STATES PATENTS 2,136,181    Courtois-Suffit _____ Nov. 8, 1938

FOREIGN PATENTS 820,434    Great Britain _____ Sept. 23, 1959

OTHER REFERENCES

Aviation Week, July 28, 1958, pages 77–79, pages 77–78 relied on.